United States Patent [19]

Dekker et al.

[11] Patent Number: 5,056,388
[45] Date of Patent: Oct. 15, 1991

[54] BLIND CUTTING MACHINE

[75] Inventors: Thomas J. Dekker, Arana Hills; Joseph Chua, Park Ridge, both of Australia

[73] Assignee: Hunter Douglas International N.V., Curacao, Netherlands Antilles

[21] Appl. No.: 505,819

[22] Filed: Apr. 6, 1990

[30] Foreign Application Priority Data

Jan. 22, 1990 [AU] Australia ............................ 48701/90

[51] Int. Cl.⁵ .................. B23B 5/14; B23B 27/04; B23B 27/08; B26B 9/02
[52] U.S. Cl. ........................................... 82/59; 82/18; 82/63; 82/70.2; 82/99.2; 82/101; 29/24.5; 30/353; 30/355; 30/356; 30/357; 51/5 C; 51/181 R; 83/666; 83/837
[58] Field of Search ................... 82/18, 63, 70.2, 99.1, 82/99.2, 128, 48, 101, 113, 59; 30/355, 356, 346.55, 357, 185, 243; 29/24.5; 51/5 C, 181 R; 83/663, 666, 673, 676, 837, 831

[56] References Cited

U.S. PATENT DOCUMENTS

| 438,959 | 10/1890 | Steele | 30/243 |
|---|---|---|---|
| 643,180 | 2/1900 | Woods | 30/355 |
| 931,043 | 8/1909 | Davis | 82/70.2 |
| 1,139,817 | 5/1915 | Smith | 51/181 R |
| 1,160,452 | 11/1915 | Sargent | 51/181 R |
| 1,214,575 | 2/1917 | Miller | 144/5 |
| 1,838,785 | 12/1931 | Overstreet | 83/837 |
| 2,326,293 | 8/1943 | Gast | 1/1 |
| 3,024,687 | 3/1962 | Brownstein | 82/59 |
| 3,159,071 | 12/1964 | Bateman | 83/411 |
| 3,715,940 | 2/1973 | Davis | 82/63 |
| 3,760,664 | 9/1973 | Gossling | 82/63 |
| 3,863,538 | 2/1975 | Behnke | 83/676 |
| 4,589,313 | 5/1986 | Meyers et al. | 82/63 |
| 4,641,562 | 2/1987 | Clarke | 407/55 |
| 4,682,919 | 7/1987 | Mitchell | 82/70.2 |
| 4,746,395 | 5/1988 | Lampe et al. | 51/5 C |

FOREIGN PATENT DOCUMENTS

| 100560 | 12/1935 | Australia | 48.3/80.5 |
|---|---|---|---|
| 731442 | 4/1966 | Canada | 164/69 |
| 373408 | 4/1923 | Fed. Rep. of Germany . | |
| 402079 | 9/1924 | Fed. Rep. of Germany . | |

Primary Examiner—William E. Terrell
Attorney, Agent, or Firm—Pennie & Edmonds

[57] ABSTRACT

A cutting member and machine for cutting elongate members is disclosed. The cutting member comprises a body having a cutting edge defining a cavity such that the cutting edge contacts a surface to be cut at at least two points. The cutting machine comprises the cutting member, a weight pivotally connected to the cutting member to define a arm-weight assembly, and a driven member defining a central opening, wherein the arm-weight assembly is pivotally attached to the driven member so as to drive the cutting member in a circular path around the central opening, the cutting edge of the cutting member being biased inwardly towards the central opening by the weight and the resultant centrifugal force. The cutting edge of the cutting member may comprise a first cutting surface having a razor like leading edge and a second cutting surface which is positioned parallel to and adjacent at least part of the first cutting surface, the second cutting surface defining a surface to remove large amounts of material, such as serrated saw teeth or an abrasive medium.

21 Claims, 4 Drawing Sheets

BLIND CUTTING MACHINE

BACKGROUND OF THE PRIOR ART

The present invention relates to cutting members such as blades for cutting both circular and non circular cross-sections, and in particular to blades and cutting machines for cutting roller blinds and the like.

Machines and blades used for cutting through elongate members such as roller blinds have been known for many years. Typically, such a device is used in department stores to produce blinds of a specific width from a stock of ready-to-use blinds. The roller tube is usually made in two sections, one of rolled formed metal and the other of cardboard. Due to the ease in slicing through cardboard, this is generally the section that is trimmed. The idle end plug is removed and the roller blind is inserted into a circular opening in the cutting machine. A circular blade in the machine cuts through both the fabric and cardboard tube of the blind and upon completion the idle end plug is reinserted. The blade used in such a machine is a circular knife blade that is held against the fabric surface by a weight acting through a pivot. This is known as a blade-arm-weight assembly which is connected to a back plate and is driven in a circular path by an electric motor. As the cutter progresses the blade is pushed further into the fabric and cardboard by the weight under the action of the centrifugal force.

However, such machines are totally inadequate for cutting through non-circular cross-sections, or through any material other than say fabric or cardboard. The circular blade tries to follow the rapidly changing surface contours of say a rectangular blind as it travels around a circular path resulting in a deformed and unsatisfactory cut. The applicant has discovered that providing a cutting edge which contacts with the surface to be cut at least two points results in a smooth cut regardless of the shape of the cross-section.

SUMMARY OF THE INVENTION

Accordingly, it is an object of the present invention to substantially overcome, or at least ameliorate, some of the abovementioned disadvantages using this principle.

Therefore, a first aspect of the present invention provides a cutting member for cutting circular and non-circular cross-sections comprising a body having at least one cutting edge, wherein said at least one cutting edge defines at least one cavity in said body so that said edge contacts a surface to be cut at least two points.

A second aspect of the present invention provides a cutting machine for cutting circular and non-circular cross-sections comprising the above mentioned cutting member, a weight pivotally connected to said cutting member to define an arm-weight assembly, and a driven back member defining a central opening, wherein said arm-weight assembly is pivotally attached to said driven member so as to drive said cutting member in a circular path around said central opening, the at least one cutting edge of said cutting member being biased inwardly towards said central opening by said weight and the resultant centrifugal force.

For preference said cutting member is a blade. Preferably, the cutting edge of the cutting member comprises a first cutting surface having a razor like leading edge and a second cutting surface which is positioned parallel to and adjacent at least part of the first cutting surface, the second cutting surface defining a surface to remove large amounts of material, such as serrated saw teeth or an abrasive medium.

In order to accommodate irregular cross-sections a cutting edge defining a plurality of curves determined by the height and width of the body to be cut is preferred.

It is also preferred that the centre of rotation of the blade of the cutting machine is positioned to allow the blade to slice through a solid cross-section without leaving a nub. The provision of means to rigidly support a body positioned within the central opening of the back plate such as a clamping device is another preferred feature. In the preferred embodiment the cutting machine and blade are used to cut roller and pleated fabric blinds.

Some preferred embodiments of the present invention will now be described, by way of example only, with reference to the drawings in which:

DESCRIPTION OF THE PREFERRED EMBODIMENT OF THE INVENTION

Figure 1:
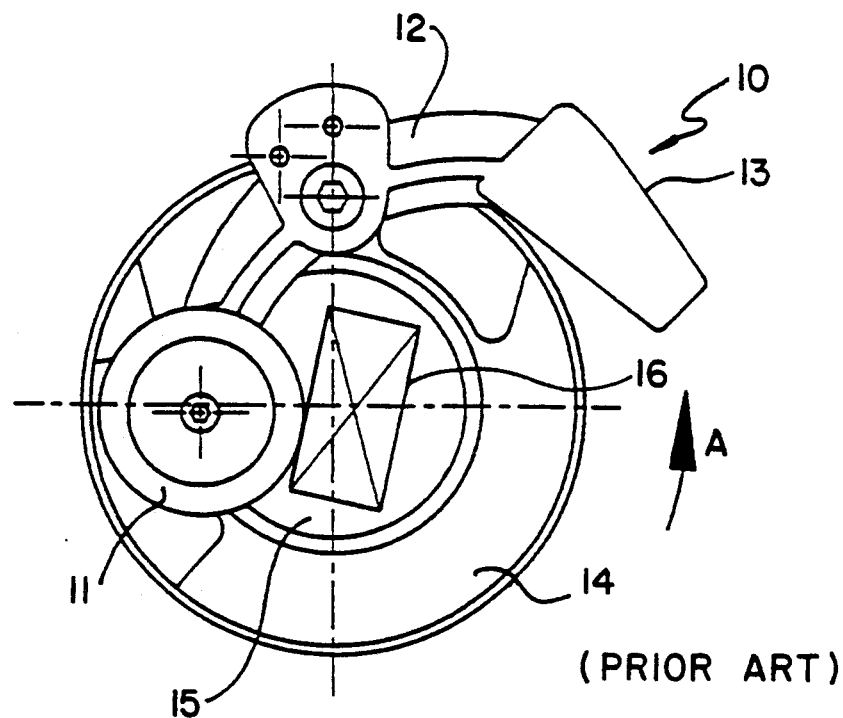
FIG. 1 shows a schematic representation of part of a cutting machine and blade assembly according to the prior art.

In FIG. 1 a prior art cutting machine and blade assembly 10 are shown. This comprises essentially a circular blade 11 pivotally connected to an arm 12 and weight 13 to form a blade-arm-weight assembly which is in turn pivotally connected to a back plate 14. The back plate 14 has a central opening 15 therein in which a body to be cut is placed. In this case the body is a rectangular blind 16. As the blade 11 moves in a circular path with the back plate 14 as defined by the arrow A it is held against the blind 16 by the weight 13 and the centrifugal force. As the rectangular blind 16 defines an irregular surface for the circular blade 11 on its circular path, the surface is buffeted and deformed resulting in an inferior cut.

Figure 2:
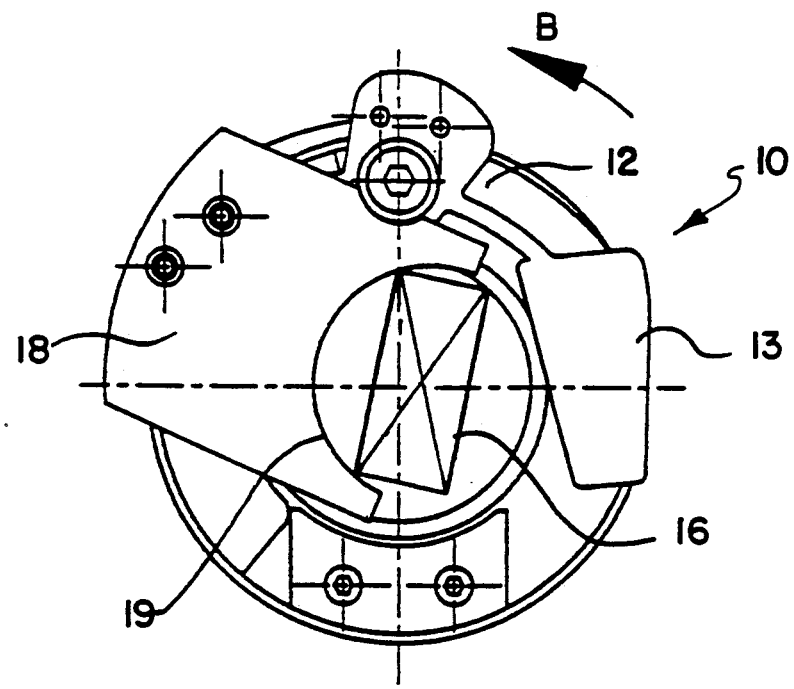
FIG. 2 shows a schematic representation of a part of a cutting machine and blade assembly according to the present invention.

FIG. 2 shows an embodiment of the invention having a similar cutting machine 10 with a cutting member 18 in the form of a blade. A blade-arm-weight assembly comprising an arm 12, a weight 13 and the blade 18 is shown, however, the blade 18 is no longer circular. In this embodiment the blade 18 has a generally rectangular configuration in which the cutting edge 19 is defined by a concave hemisphere. Such a cutting edge ensures contact with any surface at least two points. Accordingly, the circular motion of the blade 18 in the direction of arrow B will cleanly slice through the blind 16 as it is always supported and guided around the surface by two points using the principle that a circle can be drawn around any cross-sectional shape so that at least two points on the circle touch the surface.

Figure 3:
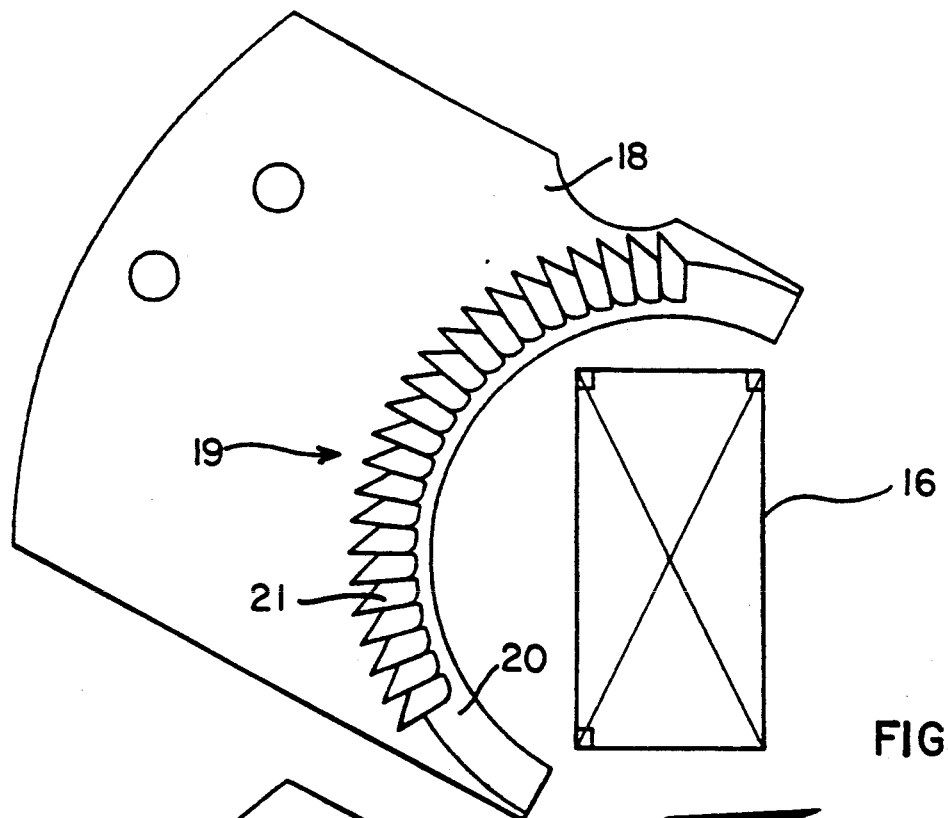
FIG. 3 shows a blade of the present invention.
Figure 4:
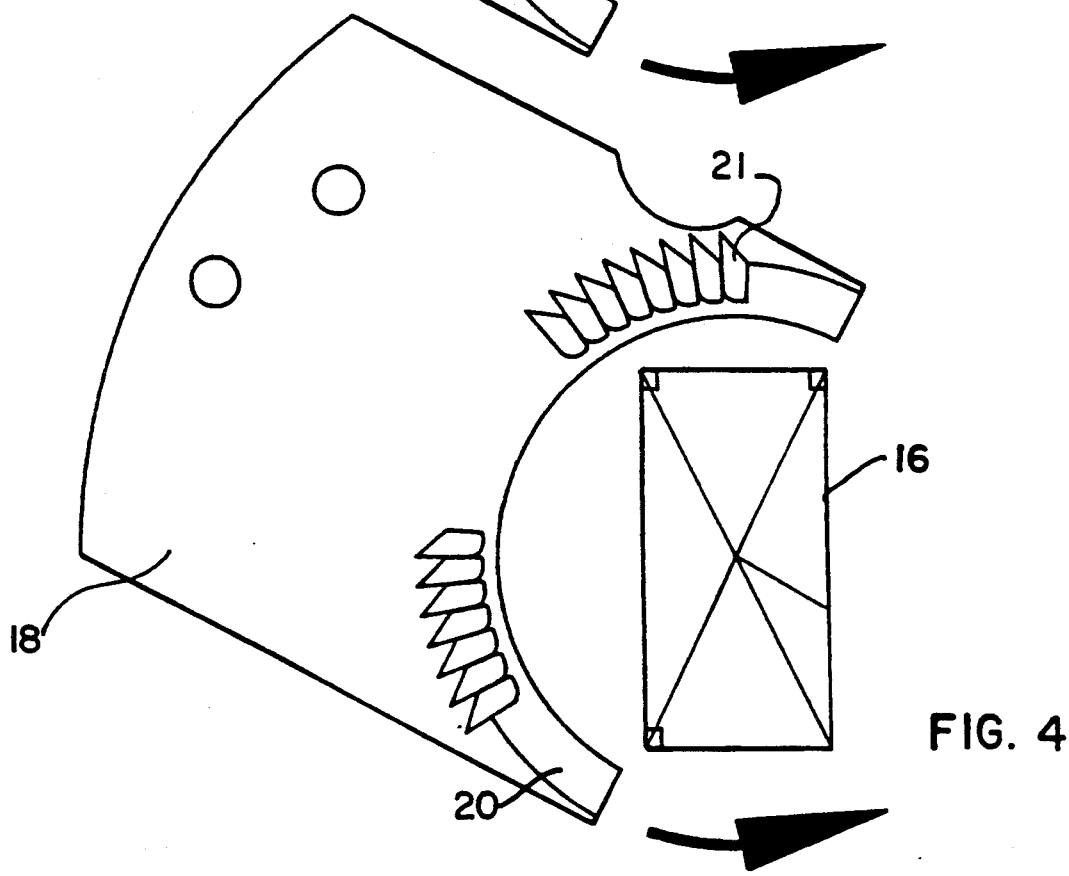
FIG. 4 shows a further blade of the present invention.

FIGS. 3 and 4 show a blade 18 which is highly suitable for cutting through composite structures such as a pleated or venetian blind which has plastic or metallic rails and a fabric body. The cutting edge 19 is divided into two surfaces, a leading razor like cutting surface 20 and a serrated surface 21. In this way the blade 18 will slice through fabric with the leading cutting surface 20 and saw through materials such as plastic and metal with the serrated surface 21.

When a pleated blind (not shown) is inserted into the machine in a stacked condition the head and bottom rails are brought together so that the pleated fabric is trapped between them. When the cutting begins the concave cutting surface 20 of the cutting edge 19 comes into contact with the plastic head and bottom rails. The serrated surface 21 saws away at the plastic surface until the blade 18 starts to make contact with the fabric. At this point the razor-like leading edge 20 of the cutting surface slices the fabric. This combination of sawing and slicing continues until the cut is complete. The result is that both the plastic and fabric are smoothly cut. In this manner an excellent finish is produced on both the plastic and fabric surfaces.

FIG. 4 shows where the serrated surface 21 is interrupted, as during cutting each point of the edge of the blade 18 follows a fixed curved path in relation to the blind and some parts of the blade 18 will never touch the plastic section of a pleated blind during the cutting process and accordingly the serrated surface is not needed in this area. The dimensions and use of the blade 18 together with the dimensions of the blind will dictate where such areas exist.

When a circular cross-section blind is cut the surface will sit snugly within the concave cavity and if the radius of the cross-section is less than that of the cutting edge the two contact points will be quite close so as to almost be superimposed on each other. Obviously not all circles will fit within all concave areas and dimensions will need to be matched.

When the section being cut has a solid central zone a point is reached when the blade 18 arrives at the centre about which it rotates and if the remaining section of material is weak enough it will break. However, this results in a protruding nub which in most cases can be filed away. However, it is preferable that the centre of rotation of the blade is positioned such that a clean slice right through the body is achieved. In the case of a pleated blind, the centre of rotation of the blade is allowed to progress from the bottom rail of the blind up through the fabric stack and into the head rail before the cut is complete.

Figure 5:
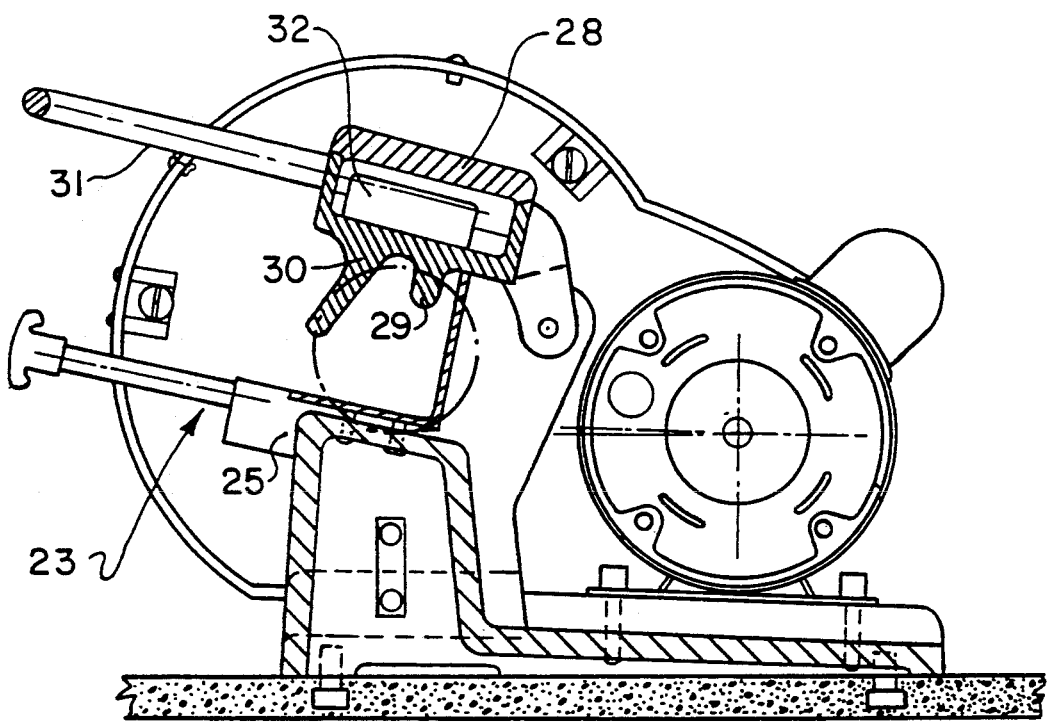
FIG. 5 shows a sectional schematic representation of a clamping as attached to a cutting machine taken along lines 5—5 of FIG. 7.
Figure 6:
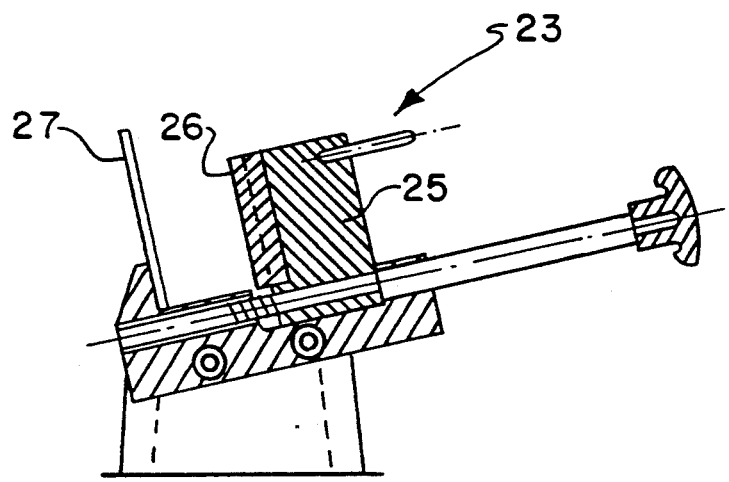
FIG. 6 shows a sectional schematic representation of the clamping device taken, along lines 6—6 of FIG. 7.
Figure 7:
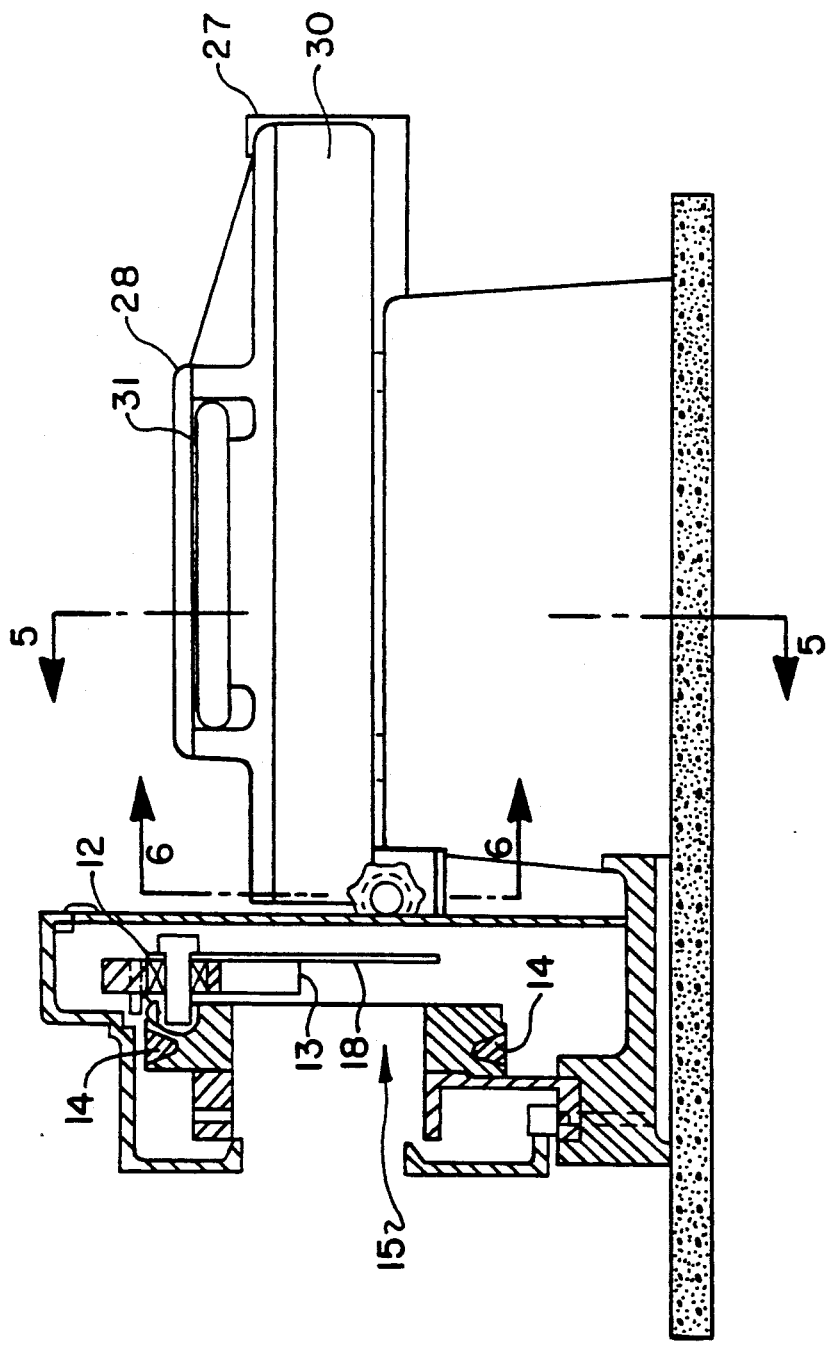
FIG. 7 is a partial sectional elevational view of a cutting machine according to the present invention.

FIGS. 5 and 6 show a retaining means 23 to hold the blind rigidly within the cutting device. This retaining means consists of a clamp 25 capable of compressing a blind between its inner surface 26 and the back plate 27. The clamp 25 can be lowered to the horizontal position when circular-section blinds are being cut. Further provided is a handle cover 28 which has two downwardly facing projections 29 and 30, the short one 29 engaging with the inside of a pleated blind head rail (not shown), and the long one 30 engaging with the outside surface of a roller blind. The handle 31 is used to apply pressure against the clamping device 25 and also allows the machine to be activated through a microswitch 32.

The foregoing describes only some embodiments of the present invention and modification obvious to those skilled in the art, can be made thereto without departing from the scope of the present invention.

For example, in the preferred embodiment of the present invention the cavity defining the cutting surface is a concave hemisphere with the dimensions of 25 mm wide and 55 mm high, suitable for use with roller blinds. However, the lower dimension limit of the cavity is determined by the rigidity of the material being cut and the shape of the cavity need not be a hemisphere but any arrangement of curves or in fact many sided. The circular shape was chosen in the preferred form to enhance the manufacture thereof. Also, the blade is not limited by saw teeth for rough cutting, and any process which will allow the removal of large amounts of material will be suitable such as an abrasive medium or other metallic cutting processes.

Non-metallic materials such as fabric and plastics have been discussed primarily in the specification however, choosing suitable blade mediums would also allow metallic materials to be cut. It is further stated that the shapes and dimensions eventually chosen will depend upon the shapes and dimensions to be cut.

We claim:

1. A cutting apparatus for cutting rolled or collapsed window coverings including a cutting member, means for rotating said cutting member about an axis, centrifugal force means for biasing the cutting member toward the axis in response to said rotating, a support structure, and a clamping member for clamping the window coverings against the support structure, wherein rotation of said cutting member biases said member toward said axis to cut a window covering lying along said axis, said cutting member comprising a body having at least one cutting edge, wherein said at least one cutting edge defines a concave edge of said body having an opening of sufficient size to receive and partially surround the window covering to be cut, said edge being adapted to contact a surface of the collapsed window covering at least at two points, said clamping member having a first shorter projection for engaging window coverings having noncircular cross sections and a second longer projection for engaging window coverings having circular cross sections.

2. The cutting apparatus according to claim 1 wherein said at least one cutting edge comprises a first cutting surface and a second cutting surface parallel and adjacent to at least part of said first cutting surface.

3. The cutting apparatus according to claim 2 wherein said first cutting surface has a razor-sharp leading edge.

4. The cutting apparatus according to claim 2 or 3 wherein said second cutting surface is abrasive.

5. The cutting apparatus according to claim 2 or 3 wherein said second cutting surface comprises serrated sections.

6. The cutting member according to claim 4 wherein said second cutting surface comprises sawtooth sections.

7. The cutting member according to claim 1 wherein said at least one cutting edge defines a plurality of curves.

8. The cutting apparatus according to claim 1 wherein the axis of rotation of the at least one cutting edge is positioned to allow the blade to slice through a solid body without leaving a nub.

9. A cutting machine for cutting elongated objects having parts of their cross-section formed of different materials, comprising:

a rotatable cutting member having a body with at least one cutting edge wherein said at least one cutting edge defines at lest one cavity in said body for receiving and at least partially surrounding the object to be cut and includes a first cutting surface and a second cutting surface parallel and adjacent to at least part of said first cutting surface, such that the object to be cut is first engaged by said first cutting surface followed by said second cutting surface;

a weight connected to said cutting member to define an arm-weight assembly;

a driven member defining a central opening, said cutting member and arm-weight assembly being pivotally mounted on said driven member to drive said cutting member in a circular path around said central opening; and means for rotating the driven member around said central opening, whereby said at least one cutting edge of said cutting member is biased inwardly across said central opening by said weight and centrifugal force resulting from rotation of the driven member.

10. The cutting machine according to claim 9, wherein said first cutting surface has a plain sharpened leading edge.

11. The cutting machine according to claims 9 or 10 wherein said second cutting surface comprises serrated sections.

12. The cutting machine according to claim 11 wherein said second cutting surface comprises sawtooth sections.

13. The cutting machine according to claim 9, wherein said at least one cavity in said body is defined by a plurality of curves.

14. The cutting machine according to claim 9 further comprising means for rigidly supporting an object to be cut when positioned within said central opening.

15. The cutting machine according to claim 14 wherein said supporting means comprises a clamp to hold said body within the reach of at least one cutting edge.

16. The cutting machine according to claim 14, further comprising a clamping member having first and second generally inward projections, said first projection adapted to engage a window covering having a rectangular cross section and said second projection adapted to engage a window covering having a circular cross section, wherein said clamping member is pivotably mounted in order to bias said window coverings against an associated support structure.

17. An apparatus for cutting, comprising:
a driven member defining a central opening through which an object to be cut is placed;

a cutting member including a concave cutting edge for receiving and at least partially surrounding the object, said cutting edge having leading and trailing cutting surfaces lying in parallel planes, said leading cutting surface being a smooth sharpened surface and said trailing cutting surface being serrated;

a weight connected to the cutting member to define an arm-weight assembly mounted on the driven member; and means for rotating the driven member to apply centrifugal force to the arm-weight assembly and move the cutting member toward the center of said central opening in response to rotation of said driven member, whereby rotation of said driven member causes the object to be engaged first by said leading cutting surface followed by said trailing cutting surface.

18. The apparatus according to claim 17, wherein said trailing cutting surface is provided only partially around said leading cutting surface.

19. The apparatus according to claim 17, further comprising retaining means adjacent to said driven member for retaining an object to be cut in said central opening, said retaining means including:
a clamping member having first shorter projection adapted to engage objects having non-circular cross sections and a second longer projection adapted to engage circular cross sections; and support structure against which said objects are clamped by said clamping member.

20. The apparatus according to claim 19, wherein said objects are window coverings and the first projection is adapted to engage a pleated blind and the second projection is adapted to engage a roller blind.

21. The apparatus according to claim 19, wherein said retaining means also includes a switching means for activating said apparatus, said switching means being activated by engagement of one of said projections with the object to be cut.

* * * * *